Patented Apr. 21, 1936

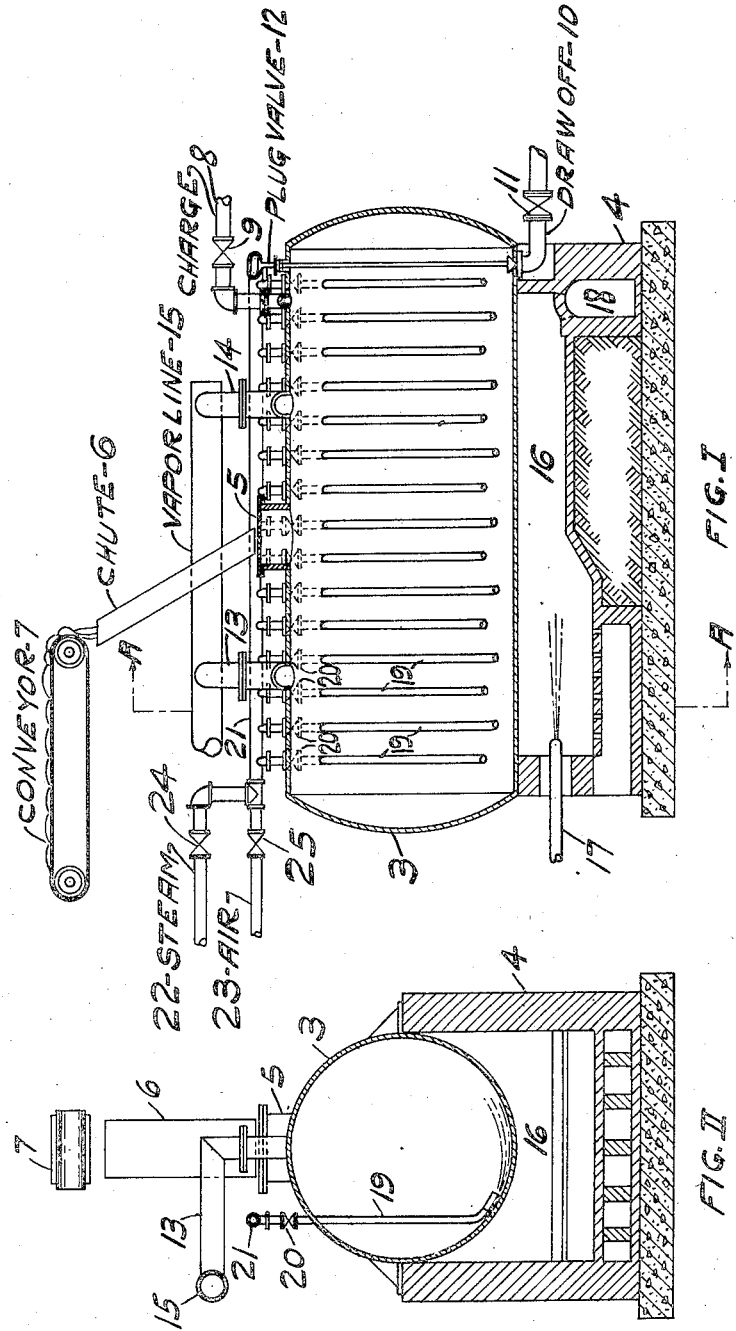

2,038,023

UNITED STATES PATENT OFFICE 2,038,023

ASPHALT COATING MATERIAL AND PROCESS OF PRODUCING SAME

Wallace A. Craig, Los Angeles, and Fred E. Griffith, Long Beach, Calif., assignors to William C. McDuffie, receiver for Richfield Oil Company of California, Los Angeles, Calif., a corporation of Delaware Original application April 11, 1933, Serial No. 665,524. Divided and this application March 1, 1935, Serial No. 8,890

6 Claims. (Cl. 106—31)

This invention relates to a new asphaltic cement or coating material and the process of producing the same. This application is a division of our application Serial # 665,524, filed April 11, 1933, now Patent No. 1,997,569 dated April 16, 1935, for Asphalt coating material and process of producing same.

Processes for the manufacture of asphalt by oxidation of petroleum oil or petroleum oil residua with air are known in the art, and also the mixing of asphalt with comminuted solids, such as sand, clay, diatomaceous earth, rock dust and the like, to modify the characteristics of the asphalt. It is generally believed that the incorporation of comminuted solids increases the useful life of the asphalt when such a mixture is applied to roofing paper, composition shingles, and other surfaces that are exposed to the elements, particularly bright sunshine. Such a mixture also finds application in the manufacture of a variety of other products where a dense asphaltic cement is needed for binding, cementing or water-proofing purposes.

Heretofore, difficulty has been experienced in producing an asphaltic material entirely suitable for the manufacture of roofing felt, asphalt shingles, battery boxes and the like, in which relatively high flash and high melting point products are required, and which will have suitable ductility under stress. We have determined that this is due to producing products which are not uniformly oxidized, in which some part of the asphaltic oil has been over oxidized, while other parts have not been sufficiently oxidized to give the required melting point, flash point and ductility.

We have now discovered that these difficulties may be overcome by oxidizing the oil in the presence of a suitable agent, with which a required non-destructive oxidizing action may be effected more uniformly to the required degree, and at the same time incorporate finely divided solid material which imparts to the finished product the ability to withstand disintegration caused by severe weather conditions.

The catalyzers or contact agents employed in our process are:

(1) Clarifying and decolorizing agents that are used to decolorize gasoline, kerosene or lubricating oil stocks, and (2) Finely ground petroleum coke.

The decolorizing agents are materials such as fuller's earth, the hydrous magnesium silicates of the talc and serpentine division, as specified in "A System of Mineralogy" by Edward Salisbury Dana, sixth edition, page 669, and clays consisting of hydrous silicates of aluminum, such as montmorillonite, bentonite and the like, and which may or may not have been processed to improve their decolorizing efficiency, and activated charcoals of animal or vegetable origin which have decolorizing properties.

The clarifying and decolorizing agents, when brought into contact with petroleum products, become coated with an adsorbed layer of asphaltic material or polymerized hydrocarbons, which we have determined are beneficial to asphaltic coating material. This adsorbed layer may be formed either during the processing of lubricating oil or other petroleum products prior to incorporating the decolorizing agent with the material to be oxidized, or it may be formed during the process herein described. Also, due to the source and the method of producing petroleum coke, a similar condition exists upon the surfaces of the coke grains. Petroleum coke is usually manufactured by destructive decomposition of petroleum oil at or above the decomposition temperature of the oil.

The manufacture of this material may take place in any suitable receptacle in which intimate contact of air and liquid may be effected. The characteristics of the finished product may be varied by varying the temperature, time of processing, proportion of air and steam used for blowing, or charging ingredients, either singly or in combination. For instance, similar results may be obtained when either an unused decolorizing agent or a spent agent is used in the process. It is our belief that when an unused agent is employed, it goes through a preliminary stage similar to that which occurs when it is used in processing lubricating oil. In other words, we have determined that adsorption and polymerization occur upon the surfaces of the grains of the solid materials. This reaction aids in the formation of the finished product, as the reduction to the grade desired is accomplished in less time in the presence of these agents.

We have also determined that petroleum coke may be employed in a similar manner. A number of other finely divided materials, such as slate dust, diatomaceous earth and talc, were tried experimentally, but the results which were obtained were not as satisfactory as those obtained from the materials described heretofore.

The benefits to be derived by producing an asphaltic material as described herein may be summarized as follows:

(1) A closer bond is obtained between the solid particles and the asphalt.

(2) Polymerization on the surfaces of the solid particles accelerates the reduction of the charge to the desired consistency.

(3) Conversion or utilization of materials that are frequently discarded by the industry into commercially useful material is effected. This is particularly true when spent decolorizing agents are used. In addition to the agent, there is the lubricating oil that is commingled with it, amounting to approximately 25 per cent. In our process this lubricating oil is converted into asphalt. With respect to the use of petroleum coke, any oil that may be admixed with the coke will be converted into asphaltic material.

(4) A variety of grades of asphaltic cement or coating material, superior to materials now available, may be produced.

An object of the invention is to produce a new asphaltic cement or coating material which will have a relatively high melting point, and at the same time have a suitable ductility. It is also our object to produce a product that will have a relatively long useful life when exposed to varying weather conditions.

Another object of the invention is to produce an asphaltic cement or coating material by a simple and efficient process, in which the various characteristics of the finished product may be controlled in order to meet the requirements of the various industries which may have occasion to use such a product.

Another object of the invention is to utilize spent clarifying and decolorizing agents, and at the same time recover in a useful form that oil which is intimately mixed with these decolorizing agents.

Another object is to prepare a new and useful product from petroleum coke.

Various other objects and advantages of the present invention will be apparent from the description of the preferred example of the new product and process embodying the invention. For this purpose reference is made to the accompanying drawing, in which there is illustrated a form of apparatus in which the invention may be performed.

In the drawing, similar numbers represent similar parts.

Figure I is a center longitudinal sectional view of a still or chamber, equipped with air and steam induction pipes, an oil charging pipe, vapor outlet pipes, a conveyor and chute for introducing contact agent, and furnace means to supply heat to the chamber.

Figure II is a detail transverse sectional view taken on line "A"—"A" of Figure I.

In Figure I, 3 represents generally a still or chamber for holding a bulk supply mixture of the oil and contact agent. Still 3 is illustrated as being of cylindrical form, horizontally arranged in furnace setting 4. Still 3 is equipped with a man hole and removable cover plate 5. Stationed above man hole and cover plate 5 is chute 6 and a belt conveyor 7 for introducing spent clarifying and decolorizing agent into still 3. A charging pipe 8, controlled by valve 9, connects still 3 at the top to a source of the petroleum oil residuum to be processed.

A draw off pipe 10, controlled by valves 11 and 12, connects still 3 at the bottom to a storage, or barrel filling device, not shown. Pipes 13 and 14 connect still 3 at the top to a vapor line or pipe 15. Vapor line or pipe 15 is connected to a condenser not shown. Furnace setting 4 is provided with fire box 16, burner 17 and flue 18 which leads to a smoke stack not shown.

An air and steam inlet pipe 21 extends longitudinally over still 3 at one side of the same, and is connected to a series of branch pipes 19 which enter still 3 at short intervals throughout its length and reach nearly to the bottom. These branch pipes 19 are bent near the open end so as to conform to the curvature of the still or chamber. The flow of air, steam, or air and steam through these branch pipes 19 is controlled by valves 20. Steam pipe 22, controlled by valve 24, and air pipe 23, controlled by valve 25, connect steam and air inlet pipe 21 to a source of steam and air respectively.

The preferred process for the production of the new asphaltic coating material, as carried out in the apparatus described, is as follows:

A bulk supply of an asphalt base or a mixed base petroleum oil residuum, having a gravity which may range from approximately 10 to 17° A. P. I., is charged into still 3 through charging pipe 8 with valve 9 open. Valve 9 is then closed and the bulk supply of oil is agitated and commingled with the required amount of spent clarifying and decolorizing agent, or other contact material, which may range from approximately 5 per cent by weight to as high as 50 per cent of the agent, the exact quantity and type used depending upon the product desired.

The agent is introduced into still 3 through man hole 5 by means of conveyor 7 and chute 6, and the mixing or commingling of the oil and agent is effected by introduction of air under sufficient pressure through pipes 23, 21 and 19, controlled and regulated by operation of valves 25 and 20. Pipes 19 form a bend near the open end, as illustrated in Figure II, so as to conform approximately to the curvature of the still, in order that the introduction of the air may produce a circulatory agitation and prevent deposition of the agent on the bottom of the still.

After the agent and oil to be processed have been commingled and substantially uniformly mixed, the mixture is heated and maintained at a temperature ranging from approximately 400 to 550° F. by the application of heat from burner 17, the products of combustion passing around the bottom of still 3, through fire box 16, and out through flue or smoke tunnel 18 to a smoke stack not shown; or the heating of the oil and agent may be commenced before or during the mixing operation.

The introduction of air is continued for a period of time ranging from 10 to 30 hours, at a rate sufficient to maintain the oil and agent uniformly mixed, and also to effect an oxidation thereof to the required degree. The quantity of air employed may range from approximately 500 cubic feet per minute to 1200 cubic feet per minute for a 200 barrel batch of mixed oil and agent, the exact quantity of air used and temperatures employed depending upon the grade of oil processed, the per cent of agent employed and the product desired.

In the manufacture of certain grades of this new asphaltic product, steam may be used in conjunction with the air, in which case, after the mixed oil and agent has attained a temperature above 212° F., valve 24 in steam pipe 22 is opened to a degree sufficient to allow the necessary amount of steam to pass into pipe 21, wherein it mixes with the incoming air from pipe 23 and passes along with the air through valves 20, pipes 19, and then into still 3. Steam is employed when it is desired to modify the rate of oxidation and separate a larger per cent of low boiling distillate from the residual oil.

The excess air and vaporous products produced by the oxidation action, together with any vaporized oil and steam, if used, pass out of still 3 through pipes 13 and 14, and then into vapor line 15, which conducts the same to a condenser not shown, wherein the vaporized oil products and water vapor are condensed and separated from the aeriform products.

When the asphaltic oil containing the spent agent has been oxidized to the required degree to produce the desired grade of asphaltic cement or coating material, the introduction of air, steam, or steam and air is discontinued and the charge is drawn off through pipe 10, by opening valves 11 and 12, into a storage, or through a barrel filling device and barreled for shipment to the trade, to be used thereafter for coating roofing felt, making battery boxes, or coating other surfaces, as heretofore stated.

While the process herein described is well adapted for carrying out the objects of the present invention, it is to be understood that various modifications and changes may be made without departing from the spirit of the invention, and the invention includes all such modifications and changes as come within the scope of the appended claims.

We claim:

1. A high melting, ductile asphalt composition for the manufacture of roofing felt, asphalt shingles, battery boxes and the like, comprising, uniformly oxidized asphalt base petroleum oil residuum containing 5 to 50% by weight comminuted petroleum coke dispersed through the mass, and bonded to said oxidized residuum by a film of polymerized hydrocarbons derived from petroleum oil, said asphalt composition being produced by oxidizing asphalt base petroleum oil residuum, commingled with petroleum coke derived from destructive decomposition process of petroleum oil, with air at temperatures ranging from 400 to 550° F.

2. A high melting, ductile asphalt composition, comprising, uniformly oxidized asphalt base petroleum oil residuum containing 5 to 50% by weight comminuted petroleum coke dispersed through the mass, and bonded to said oxidized residuum by a film of polymerized hydrocarbons derived from petroleum oil, said asphalt composition being produced by agitating asphalt base petroleum oil residuum, commingled with petroleum coke derived from destructive decomposition processes of petroleum oil, with air at temperatures ranging from 400 to 550° F., for a period of time ranging from ten to thirty hours.

3. A process of producing a high melting, ductile asphalt composition for the manufacture of roofing felt, asphalt shingles, battery boxes and the like, comprising, mixing 5 to 50% by weight comminuted petroleum coke, derived from destructure decomposition processes of petroleum oil, with asphalt base petroleum oil residuum, then oxidizing and reducing the mixture by blowing with air to an asphalt consistency, at an oxidizing temperature ranging from approximately 400 to 550° F., for a period of time not less than ten hours.

4. A process of producing a high melting, ductile asphalt composition for the manufacture of roofing felt, asphalt shingles, battery boxes and the like, from petroleum oil residuum containing asphalt base petroleum oils, comprising, oxidizing the petroleum oil residuum, mixed with 5 to 50% by weight petroleum coke derived from destructive decomposition processes of petroleum oil, by blowing the mixture with air at temperatures ranging from 400 to 550° F., for a period of time ranging from ten to thirty hours, and reducing the mixture to an asphalt consistency.

5. A process of producing a high melting, ductile asphalt composition for the manufacture of roofing felt, asphalt shingles, battery boxes and the like, comprising, oxidizing the oil residuum, mixed with 5 to 50% by weight petroleum coke derived from destructive decomposition processes of petroleum oil, by blowing the mixture with air and steam at temperatures ranging from 400 to 550° F., for a peroid of time ranging from ten to thirty hours, and reducing the mixture to an asphalt consistency.

6. In the process of producing oxidized asphalt from petroleum oil residuum containing asphalt base petroleum oils as the principal ingredients, the improvement which consists in oxidizing the residuum, mixed with 5 to 50% by weight comminuted coke coated with polymerized hydrocarbons, by blowing the mixture with air for a period of time not less than ten hours, at temperatures ranging from 400 to 550° F., and reducing the mixture to an asphalt consistency.

WALLACE A. CRAIG.
FRED E. GRIFFITH.